United States Patent
Trevino

[11] Patent Number: 5,768,797
[45] Date of Patent: Jun. 23, 1998

[54] POWERED REEL-TYPE TAPE MEASURING DEVICE

[76] Inventor: Hector Trevino, 2972 Royal La., Dallas, Tex. 75229-3604

[21] Appl. No.: 608,847

[22] Filed: Feb. 27, 1996

[51] Int. Cl.$^6$ ................................................. G01B 3/10
[52] U.S. Cl. ............................... 33/761; 33/763; 33/759; 33/520
[58] Field of Search .............................. 33/761, 762, 763, 33/759, 760, 520; 242/390, 390.1, 390.2, 390.8, 390.9

[56] References Cited

U.S. PATENT DOCUMENTS

| | | | |
|---|---|---|---|
| 4,189,107 | 2/1980 | Quenos et al. | 33/761 |
| 4,435,904 | 3/1984 | Logan et al. | 33/18.1 |
| 5,044,089 | 9/1991 | Petkovic et al. | 33/763 |
| 5,251,382 | 10/1993 | Hellar | 33/759 |
| 5,386,643 | 2/1995 | Corcoran | 33/762 |
| 5,433,014 | 7/1995 | Falk et al. | 33/759 |
| 5,440,820 | 8/1995 | Hwang | 33/761 |
| 5,448,837 | 9/1995 | Han-Teng | 33/761 |
| 5,471,761 | 12/1995 | Cheng | 33/761 |

FOREIGN PATENT DOCUMENTS

| | | | |
|---|---|---|---|
| 2658580 | 6/1978 | Germany | 33/762 |

*Primary Examiner*—Christopher W. Fulton
*Attorney, Agent, or Firm*—Jones, Day, Reavis & Pogue

[57] ABSTRACT

A powered reel-type tape measuring device that has a reel of flexible metal measuring tape rotatably mounted on a shaft in a housing with measuring indicia on the tape. An electric powered motor is coupled to a flexible drive roller for pulling the tape from the housing and to the reel itself for pulling the tape into the housing and rewinding it on the reel. A switch having first and second contacts is operatively coupled to the electric power device for energizing the power-driven device to selectively rotate the flexible roller to pull the tape in a forward direction out of the housing with activation of the first switch contact and to drive the reel to pull the tape into the housing for rewinding when the switch is activated in the second position.

3 Claims, 1 Drawing Sheet

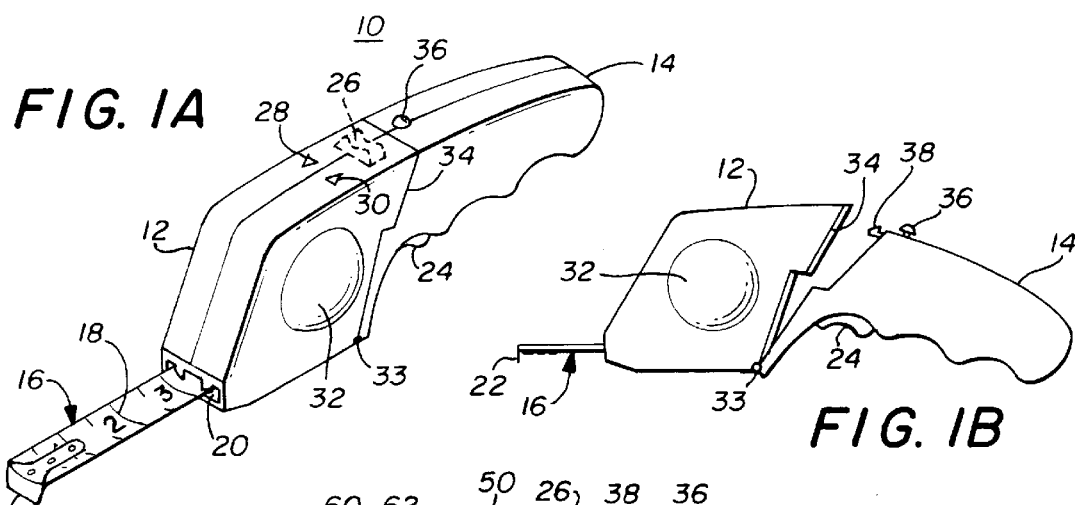
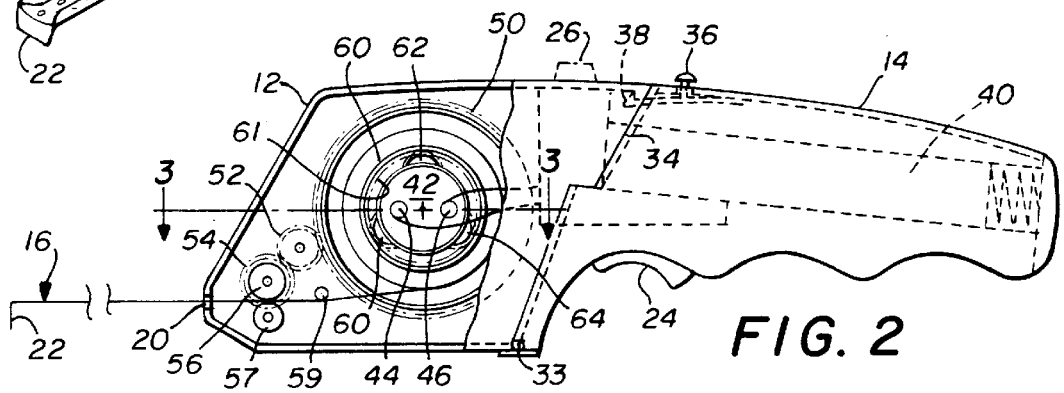
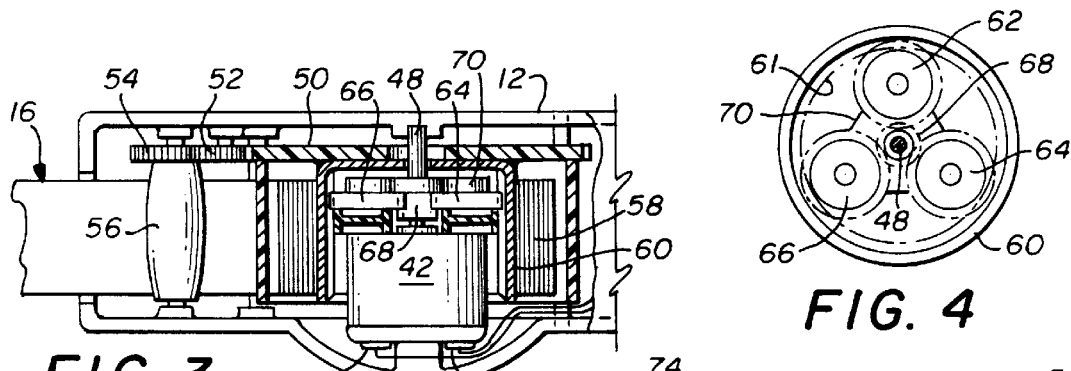
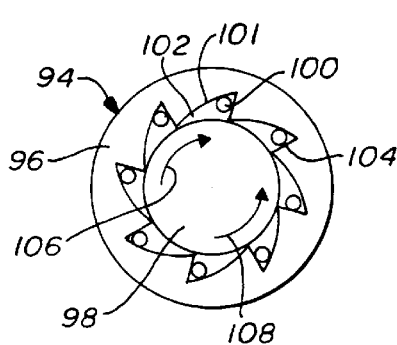
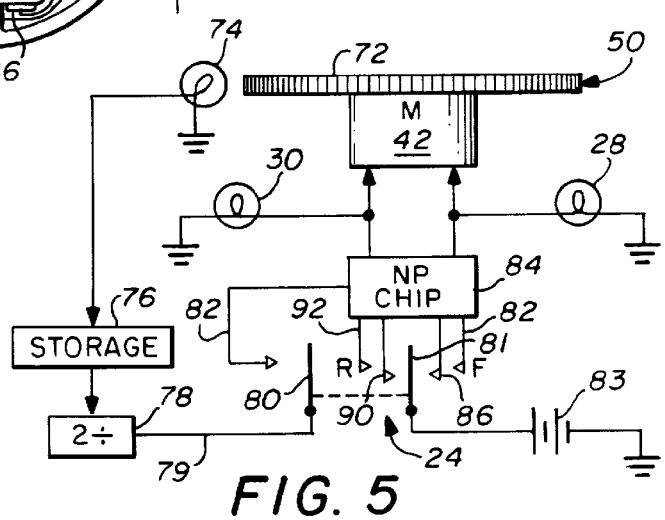

POWERED REEL-TYPE TAPE MEASURING DEVICE

BACKGROUND OF THE INVENTION

1. Field of the Invention

The present invention relates generally to distance measuring devices and in particular to a tape measuring device formed of a reel of flexible metal tape rotatably mounted in a housing and having a reversible electric motor in the housing and coupled to the reel for causing the metal tape to selectively extend from and retract into the housing.

2. Description of Related Art Including Information Disclosed Under 37 CFR 1.97 AND 1.98

Reel-type tape measuring devices are well known in the art. Some of them include an elongated strip of cloth-like material having measuring indicia thereon such as inches and fractions thereof and which is wound on a reel or spool encased in a housing. Other tape measuring devices are formed of plastic or metal strips of flexible material having measuring indicia thereon such as feet and inches and fractions thereof. In such cases, the tape is wound on a spool in a housing that is associated with a spring such that, as the tape is pulled from the housing, the spring is wound and, upon release of the tape, the spring will retract the tape into the housing. In such cases, brakes or locking mechanisms are utilized to hold the tape in its extended position for measuring purposes.

There are many occasions where the user of the tape, such as during the construction of a building, is alone and needs to measure the dimensions of a room or other area. It is difficult for the individual to stand on one side of the room and move the tape outwardly from the housing until it extends to the other side of the room and then make a proper measurement. In other cases, it is necessary that a center point be determined such as the center of a proposed room. In such case, the user of the tape must extend it across the room, determine the width, and then divide it by two to determine where the center point is and then measure again using the divided dimensions.

It would be helpful to have a power-driven reel tape device in which the flexible tape strip, that has the measuring indicia thereon, is wound on a reel in a housing and which could be power driven out of the housing to a desired distance and then the appropriate measurements taken.

SUMMARY OF THE INVENTION

The present invention overcomes the disadvantages of the prior art by providing a powered reel-type tape measuring device. In this case, a reversible electric motor is mounted in the tape housing and coupled to the reel on which the tape is wound for rotating the reel to cause the end portion of the metal tape to extend from and retract into the housing. The reversible motor is coupled through an idler gear to a frictional drive roller in contact with the metal tape to pull it from the reel and extend it out of the housing. A planetary gear system couples the reversible electric motor to the reel to rotate the reel and wind the tape on the reel. The planetary gear system allows slippage between the reel and the drive motor as the amount of tape on the reel increases and decreases so that the speed at which the reel is driven can vary as necessary.

A microchip is placed in the housing and couples a switch means to the reversible electric motor for causing the motor to drive the reel to move the tape out from or in toward the housing in accordance with the switch means operation. Gear teeth on the drive gears coupling the frictional drive roller to the reversible electric motor are counted by a detector associated therewith as the tape is moved outwardly from the housing any predetermined distance. A storage means stores the count of the number of teeth passing the detector. A divide circuit is coupled to the storage means for dividing the storage count by two. A third contact is formed on the switch for connecting the divided count that is stored to the microprocessor when the third contact is activated to cause the motor to rewind the tape to one-half of the distance it was extended to enable a center point to be easily selected.

Indicia in the preferred form of light-emitting diodes are mounted in the housing with a first indicia to indicate the travel of the tape in a direction outwardly from the housing and a second indicia to indicate travel of the tape in a direction inwardly toward the housing.

Thus it is an object of the present invention to provide a powered reel-type tape measuring device that overcomes the disadvantages of the prior art.

It is also an object of the present invention to provide a powered reel-type tape measuring device that is driven by a reversible electric motor mounted in the housing with a switch having first and second positions for causing the motor to drive the tape out of the housing or retract it into the housing, depending upon the switch position.

It is still another object of the present invention to provide both slow and fast speeds for moving the tape out of or into the housing.

It is yet another object of the present invention to provide a microprocessor chip in the housing for controlling the operation of the reversible motor.

It is also an object of the present invention to provide a circuit coupled to the microprocessor through a third switch contact for causing the motor to retract the tape exactly one-half of the distance that it was extended to enable a center point of the measured distance to be determined.

Thus, the present invention relates to a powered reel-type tape measuring device including a housing, a reel rotatably mounted in the housing, flexible metal or plastic tape having measuring indicia thereon being mounted in a spool on the reel with an end portion extending from the spool, an exit slot in the housing through which the end portion of the tape protrudes, electric power-driven means coupled to the reel for driving the tape out of and into the housing through the exit slot, and a switch device having first and second contacts operatively coupled to the electric power-driven means for energizing the power-driven means to selectively rotate the reel to drive the tape in a forward direction out of the housing with activation of the first contact and in a reverse direction to pull the tape into the housing with activation of the second contact.

BRIEF DESCRIPTION OF THE DRAWINGS

These and other features of the present invention will be more fully disclosed in the following DETAILED DESCRIPTION OF THE PREFERRED EMBODIMENT in which like numerals represent like elements and in which:

FIG. 1A is a perspective view of the novel powered reel-type tape measuring device of the present invention;

FIG. 1B is a side view of the novel tape measuring device of FIG. 1A illustrating the rear handle portion thereof pivotally connected to the front portion such that a battery can be inserted in the handle;

FIG. 2 is a partial cross-sectional side view of the novel tape measuring device with a cutaway illustrating the drive motor, the reel of tape and the gears for driving the frictional roller for pulling the tape outwardly from the storage reel in the housing in which it is placed;

FIG. 3 is a partial cross-sectional view of the novel powered tape measuring device taken along lines 3—3 of FIG. 2;

FIG. 4 is a schematic drawing of a planetary gear system coupling the reversible electrical motor to the tape reel for allowing slippage between the reel and the drive motor to vary the rotational speed of the reel as the amount of tape on the reel increases and decreases;

FIG. 5 is a partial schematic and partial electrical diagram of the drive circuit for the reversible motor; and FIG. 6 is a diagrammatic representation of an alternate drive system for allowing slippage between the reel and drive motor.

DETAILED DESCRIPTION OF THE PREFERRED EMBODIMENT

FIG. 1A is an isometric view of the novel powered reel-type tape measuring device 10. It includes a tape housing portion 12 and a handle portion 14 that contains the batteries for powering the reversible electric motor that drives the tape 16, having indicia 18 thereon, inwardly and outwardly from the housing 12. Tape 16 is a typical prior art tape that has an end portion 22 that is conventional on plastic or metal-type tape measuring devices and exits a slot 20 in the housing 12. The tape 16 may be of any type such as plastic or metal and that is sufficiently flexible to be wound on a reel 60 (shown in FIG. 2 and FIG. 3). Hereinafter, for simplicity in explanation, the tape 16 will be referred to as "tape" or "metal tape". A reversible switch 24 having two positions may be used to cause the reversible motor to rotate in the appropriate direction to extend or retract the tape 16 from the housing 12. The switch 24 could be located at 26 if desired as a rocker switch well known in the art. Indicia 28 and 30 which may be, for instance, light-emitting diodes, are placed on the housing 12 to indicate that the reversible motor is energized and the tape is moving either outwardly or inwardly to or from housing 12. An extended convex surface 32 may extend outwardly from the housing 12 to accommodate the reversible motor mounted inside the housing as will be shown more particularly in relation to FIG. 3. The housing 12 and handle portion 14 may be pivotally attached to each other at 33 so that by depressing latch 36, the handle portion 14 may separate from the housing 12 along line 34 to the pivot point 33 as illustrated in FIG. 1B so that access can be had to the battery for replacement thereof Latch 36 may be of any well-known type having a projection 38 extending outwardly from handle 14 towards body portion 12 such that when the body portion 12 is pivotally moved towards the handle 14, the extension 38 catches a mating projection (not shown) in housing 12 to latch the handle 14 to the body portion or housing 12. Any well-known type of latch may be used to pivotally latch the housing 12 to the handle 14.

FIG. 2 is a side view of the novel powered tape measuring device with the interior of the housing portion 12 partially shown in detail to illustrate the manner in which the reversible motor 42 causes the tape 16 to move outwardly from and inwardly to the housing 12.

As can be seen in FIG. 2, in phantom lines, a battery 40 may be mounted in the handle 14 for powering the device. It is connected through well-known means by switch 24 to the reversible motor 42. Terminals 44 and 46 are shown in FIG. 2 on reversible motor 42 for receiving power through appropriate leads from the control switch 24 (or 26, if mounted on top as described earlier). Motor 42 drives a gear 50 through its shaft 48, as can best be seen in FIG. 3. Gear 50 drives an idler gear 52 which is also coupled to drive gear 54. Drive gear 54 is mounted on the same shaft with a roller 56 that is a frictional roller having been formed of a rubberized-type material or any other frictional material and having a convex shape that matches the upper concave surface of the metal tape 16 as can best be seen in FIG. 1A Roller 56 mates with a roller 57 between which the tape 16 passes. Roller 57 may or may not be a frictional material and has a concave shape to receive the convex bottom surface of tape 16. As motor 42 drives the gear 54 which turns roller 56, the frictional engagement of the roller 56 pulls the tape 16 from the reel or spool 60 on which the tape is wound. An idler roller 59 guides the tape onto and off of the reel 60 on which it is mounted.

Because roller 56 will be driven at a constant speed, and because the reel 60 will turn at different speeds depending upon the amount of tape thereon, reel 60 has teeth 61 on the interior thereof that are driven by a planetary gear system best shown in FIG. 4 that includes a triangular frame 70 on which are mounted three rotatable gears 62, 64, and 66. A drive gear 68 is attached to the shaft 48 of motor 42. Thus the roller 56 and the reel 60 will both be driven simultaneously but, because the speed of the reel 60 will be changing with respect to the speed of the roller due to the differences in diameter of the reel caused by the amount of tape thereon, the planetary gear system comprised of the gears 62, 64, and 66 can rotate within the reel housing 60 thus allowing slippage between the speed of rotation of the reel and the drive motor that is driving roller 56. Such planetary gear systems are old and well known in the art and need not be discussed further here. Suffice it to say that when tape is being extended from the housing 12, roller 56 will provide the frictional force to pull the tape from the reel 60. However, when the tape 16 is being retracted into the housing portion 12, roller 56 will keep tension applied to the tape 16 while reel 60 is driven at the speed necessary to steadily wind the tape 16 onto the reel 60 with the planetary gear system providing the necessary differences in speed of rotation of the reel 60 and the frictional drive roller 56.

As can be seen in FIG. 4, the planetary gear system is enclosed on the inside of the cup-shaped reel 60. Reel 60 has gear teeth 61 on the internal side thereof which mesh with the teeth on gears 62, 64, and 66. As the motor 42 turns shaft 48, gear teeth 68 thereon mesh with the gear teeth on the gears 62, 64, and 66 causing them to engage teeth 61 on the inside of reel 60, thus turning the reel. Because the planetary gear system including support 70 on which the gears 62, 64, and 66 are mounted is free to rotate within the interior of reel 60, any variation in speed between the reel 60 and the drive roller 56 can be accommodated by the relative movement of the planetary gear system with respect to the interior of the reel 60. This operation is well known in the art.

An alternative method of enabling the proper relative movement between drive roller 56 and reel 60 would be to provide well-known one-way drive systems for the frictional driving roller and the tape reel 60 as shown in FIG. 6. The one-way drive system 94 includes an outer ring 96 surrounding an inner 5 shaft 98. Bearings 100 are placed in slots 101 in the outer ring 96 that are narrow at one end 102 and wide or deep at the other end 104. When inner shaft 98 rotates in the direction of arrow 106, bearings 100 are moved to the deep end 104 of slots 101 and no connection exists between shaft 98 and outer ring 96. When shaft 98 rotates in the direction of arrow 108, the bearings move to narrow end 102 of slots 101 thus coupling shaft 98 to outer ring 96 to rotate ring 96. Thus, one of the one-way drive systems is mounted to drive friction roller 56 in a direction to cause the tape 16 to be pulled outwardly from the housing 12. However, in the reverse direction, the one-way gear system would not engage and frictional roller 56 would be an idler. The reverse would be true with respect to the one-way gear system replacing the planetary gear system mounted on frame 70. That one-way gear system would be coupled to the motor shaft 48 such that, when the tape 16 is being moved outwardly from the housing portion 12, there would be no connection between the one-way drive gear and the tape 16 reel 60 while, when the tape is being drawn inwardly into the housing portion 12, the one-way drive gear would make connection between the drive motor shaft 48 and the tape reel 60. Thus the tape reel 60 would wind the tape up and pull it inwardly from the exterior of the housing while drive roller 56 idled. In the reverse direction, drive roller 56 would pull the tape 16 out of the housing 12 while the tape reel 60 would simply idle and rotate freely to allow the tape 16 to come off of the reel.

FIG. 5 is a partial electrical schematic diagram of the drive system for the novel powered reel-type tape measuring device. As can be seen in FIG. 5, motor 42, the reversible motor, drives gear 50 on which is located teeth 72. The switch 24 has a center contact 81 that can be moved in two directions. In the first direction, as the switch 24 is depressed it engages contact 86 which provides a signal to the microprocessor chip 84 to drive the tape forward out of the housing 12 at a slow speed. Microprocessor chip 84 is one of many well-known types available in the prior art and need not be discussed in detail here. Further depression of the switch 24 in the same direction makes additional contact with switch contact 88 which provides a signal to the microprocessor chip 84 to drive the motor 42 at a fast speed to drive the tape 16 out of the housing 12. In addition, the light 28 is illuminated in either case. When the switch 24 is pressed in the opposite direction, it first engages contact 90 to provide power from battery 83 to the chip 84 to cause reversible motor 42 to reverse its direction and rewind the tape at the slow speed. If the switch 24 is further depressed in the same direction, contact will also be made with switch contact 92 which provides a signal to the chip 84 to move the tape inwardly at a fast speed, which speed is, for example only, twice the speed of the slow speed drive. Again, light 30 is illuminated to indicate on the housing as illustrated in FIG. 1A that the tape is moving inwardly.

There are occasions when it is desirable to determine the half-point of a particular distance. For instance, if tile were going to be laid in a particular room, it may be desirable to start at the interior center section of the room and move outwardly toward each side. There are, of course, other reasons for determining the half-length or mid-point of a particular measurement. The present tape provides this measurement automatically. As the tape is moving outwardly being driven by motor 42 through gear 50, a detector or light 74 counts the teeth 72 in a well-known manner. The count is stored in storage device 76 and that count is automatically divided by divider circuit 78 to give a half-count on line 79. Thus, when the switch 24 is moved sufficiently downwardly when retracting the tape 16 into the housing 12, it will also close third contact 80 with line 92 thus coupling the divide by two-count from divider 78 to the microprocessor chip which causes motor 42 to drive the tape into the housing exactly one-half the distance it was driven out from the housing. Then the microprocessor chip 84 will stop movement of the tape by removing power to motor 42 at the proper point thus stopping the tape at the mid-point from that which was originally measured.

Thus, the present invention discloses a powered reel-type tape measuring device that has a reversible motor to move the tape into and out of the housing 12. These tapes are metal or plastic tapes that are sufficient to move a large distance out from the tape housing without bending. Such tapes are old and well known in the art. A switch control is mounted on the housing to enable the user to move the tape outwardly from or inwardly into the housing based on the direction in which the switch is depressed. Further, the switch has two levels of depression for both forward and reverse so that the tape can be driven fast or slow speeds out from and into the housing.

In addition, a speed control or slippage control device is provided between the drive motor and the tape reel so that the tape reel can change rotational speeds depending upon the amount of tape on the reel as it moves in and out of the housing.

In addition, a microchip controller provides a means for automatically determining a half-point of a measured distance by determining the distance the tape moved outwardly from the housing, then determining the half-way distance, and providing a signal to the motor to move the tape inwardly until that point is reached.

While the invention has been described in connection with a preferred embodiment, it is not intended to limit the scope of the invention to the particular form set forth, but, on the contrary, it is intended to cover such alternatives, modifications, and equivalents as may be included within the spirit and scope of the invention as defined by the appended claims.

I claim:

1. A powered reel-type tape measuring device including:

a housing;

a reel rotatably mounted in the housing;

flexible metal tape having measuring indicia thereon, said tape being mounted in a spool on said reel with an end portion extending from said spool;

an exit slot in said housing through which the end portion of said tape passes;

electric power-driven means coupled to said reel for driving said tape out of and into said housing through said exit slot;

switch means operatively coupled to said electric power-driven means for energizing said power-driven means to selectively rotate said reel and drive said tape in a forward direction out of said housing and in a reverse direction into said housing;

a microprocessor in said housing coupling said switch means to said reversible electric motor causing said motor to drive said tape out from or in towards said housing in accordance with said switch means operation;

at least one roller in the housing for engaging the metal tape;

said at least one roller being formed of pliable material frictionally engaging the metal tape; drive gears coupling the at least one roller to the reel such that the frictional roller applies a force to the metal tape to pull the tape from the reel as the reel is rotated by the motor;

gear teeth on said drive gears coupling the said at least one roller to the reversible electric motor;

detection means associated with said gear teeth counting the number of teeth passing said detector means as said tape is moved outwardly from said housing a predetermined distance;

a storage means for storing said count of the number of teeth passing said detector means;

a divide circuit coupled to said storage means for dividing said stored count by two; and a contact on said switch means for connecting said divided count to said microprocessor when said contact is actuated to cause said motor to rewind said tape to one-half of the distance it was extended to select a center point.

2. In a powered reel-type tape measuring device including:

a housing;

a reel rotatably mounted in said housing;

a flexible tape having measuring indicia thereon and being wound on said reel;

an electric power-driven motor coupled to said reel for driving said tape out of and into said housing; and a microprocessor in said housing being operatively coupled to said electric power-driven motor for causing said motor to extend said tape out from or retract said tape toward said housing, the improvement comprising:

switch means coupled said microprocessor, said switch means having a first position for causing said microprocessor to extend said tape out of said housing and a second position for causing said microprocessor to retract said tape toward said housing;

detector means in said housing for determining the distance said tape extends outwardly from said housing; and a third position on said switch means for connecting said detector means to said microprocessor such that when said switch means is actuated to close said second and third switches, said microprocessor causes said motor to retract said tape toward said housing a distance equal to one-half of the extended distance thereby enabling the half point of the measured distance to be automatically determined.

3. The improved powered reel-type tape measuring device of claim 2 wherein said detector means comprises:

at least one roller in the housing being formed of pliable material and frictionally engaging the metal tape;

drive gears coupling the at least one roller to the reel such that the frictional roller applies a force to the metal tape to pull the tape from the reel as the reel is rotated by the motor;

gear teeth on said drive gears coupling said at least one roller to the reversible electric motor;

counting means associated with said gear teeth for counting the number of teeth passing said detector as said tape is moved outwardly from said housing a predetermined distance;

storage means for storing said count of the number of teeth passing said counting means;

a divide circuit coupled to such storage means for dividing said stored count by two; and said third position of said switch means connecting said divided count to said microprocessor when said switch is actuated to said third position to cause said motor to rewind said tape to one-half of the distance it was extended to select a center point.

* * * * *